Aug. 25, 1970     F. JEANPRETRE ET AL     3,525,277
AUTOMATIC LATHE
Filed June 25, 1968     2 Sheets-Sheet 1
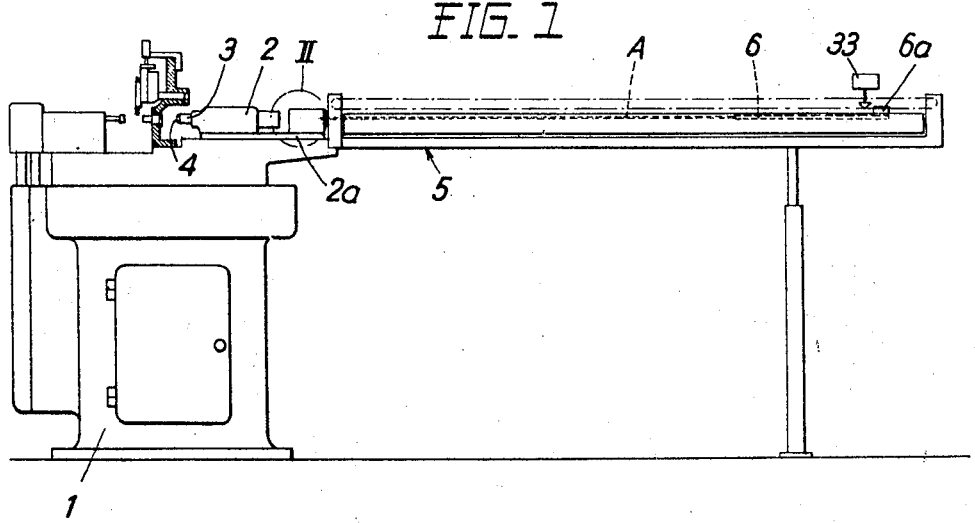
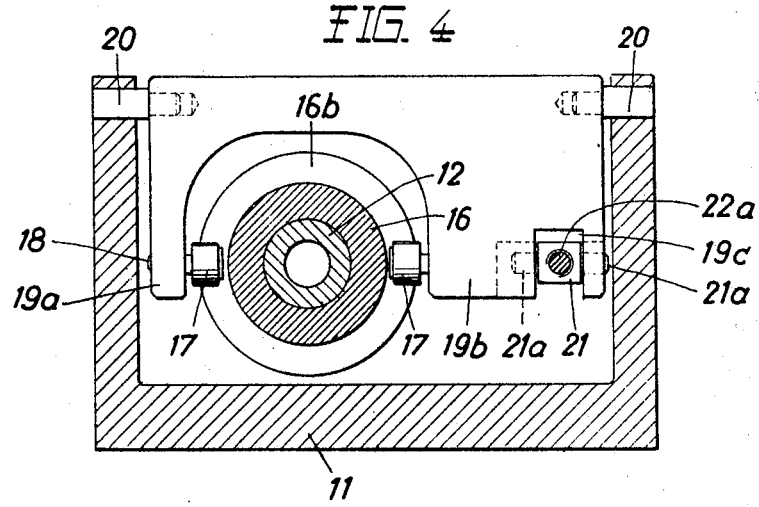
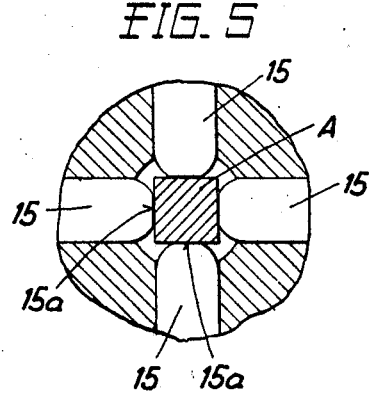
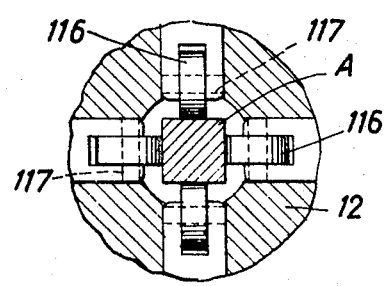

United States Patent Office 3,525,277
Patented Aug. 25, 1970

3,525,277
AUTOMATIC LATHE
Francis Jeanpretre and Charles Gurtner, Moutier, Switzerland, assignors to Fabrique de machines Andre Bechler S.A., Moutier, Bern, Switzerland, under the laws of Switzerland
Filed June 25, 1968, Ser. No. 739,823
Claims priority, application Switzerland, June 29, 1967, 9,283/67
Int. Cl. B23b 13/00
U.S. Cl. 82—2.5    8 Claims

ABSTRACT OF THE DISCLOSURE

A lathe with an automatic loader and a chuck for accepting bar stock of polygonal cross section and having a tubular transmission member free to rotate about the workspindle axis and to move longitudinally, which member incorporates pusher elements acting on the stock as it is loaded and rotationally orienting the member with respect to the stock, and a clutch arrangement operated by the longitudinal movement of the member for rotating the latter and the stock with the workspindle until the stock is correctly positioned in the chuck.

BACKGROUND OF THE INVENTION

Automatic lathes are known which are equipped with an automatic bar loader for loading-in bars of material without the necessity of stopping the workspindle, provided that the bar of material has a circular cross-section.

The present invention relates to an automatic lathe comprising a headstock in which a workspindle is mounted which is equipped at its fore end with a chuck for holding a bar of material having a polygonal cross-section, such lathe being intended to be equipped with an automatic loader for feeding the bar of material through the rear end of the workspindle.

If an automatic lathe having a chuck for holding a bar of material having a polygonal cross-section should be equipped with such an automatic loader which should be able to put-in a new bar without the necessity of stopping the workspindle many difficulties arise. In fact, experience has shown that it is necessary not only to give to the bar of material a rotary motion at a speed equal to that of the workspindle but also to give the bar of material a correct orientation with regard to the workspindle so that it may pass correctly through the opening of the chuck, which opening must have a cross-section adapted to that of the bar of material.

SUMMARY OF THE INVENTION

The main object of the present invention resides in overcoming these difficulties. To this end the automatic lathe according to the invention comprises in combination a tubular transmission member located at the rear end of the workspindle and mounted for free rotation around an axis coinciding with that of the workspindle, this transmission member being equipped, on the one hand, with pusher elements which orient it with respect to the profile of the bar of material by coming to press on at least some of the longitudinal surfaces of the bar of material and, on the other hand, with clutch means capable to come into cooperation with a clutching member fastened to the rear end of the workspindle, such cooperation being at first a frictional engagement and then a positive engagement in a predetermined relative angular position, thereby to orient the bar of material in the chuck.

This object and others of the invention will be apparent from the ensuing detailed description.

BRIEF DESCRIPTION OF THE DRAWING

The invention will be described with reference to the figures of the accompanying drawing, wherein:

FIG. 1 is a diagrammatic elevational view of a well-known prior-art automatic lathe and loader, and indicates the place where the supplementary device provided by the present invention is removably arranged for use each time when a bar of material is to be fed by the loader to the automatic lathe, FIG. 4 is a partial cross-section along the line IV—IV of FIG. 2, FIG. 5 is a digrammatic section showing the action of the pressure elements on the bar of material, which in the example has a square cross-section; and FIG. 6 is a cross-section similar to FIG. 5 and shows a modification of the pressure elements.

DESCRIPTION OF THE PREFERRED EMBODIMENTS

Figure 2:
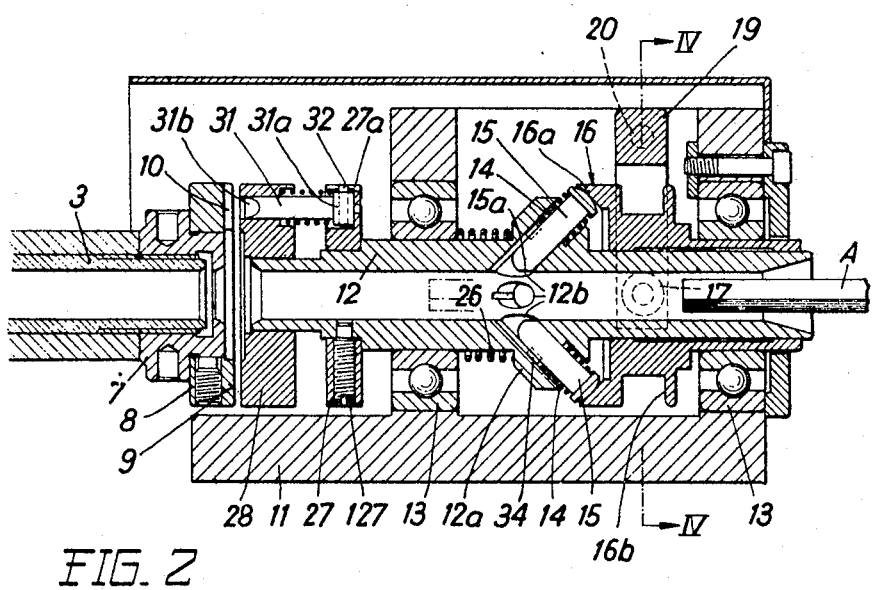
FIG. 2 is a vertical cross-section of that portion of the assembly which in FIG. 1 is indicated by a circle II.
Figure 3:
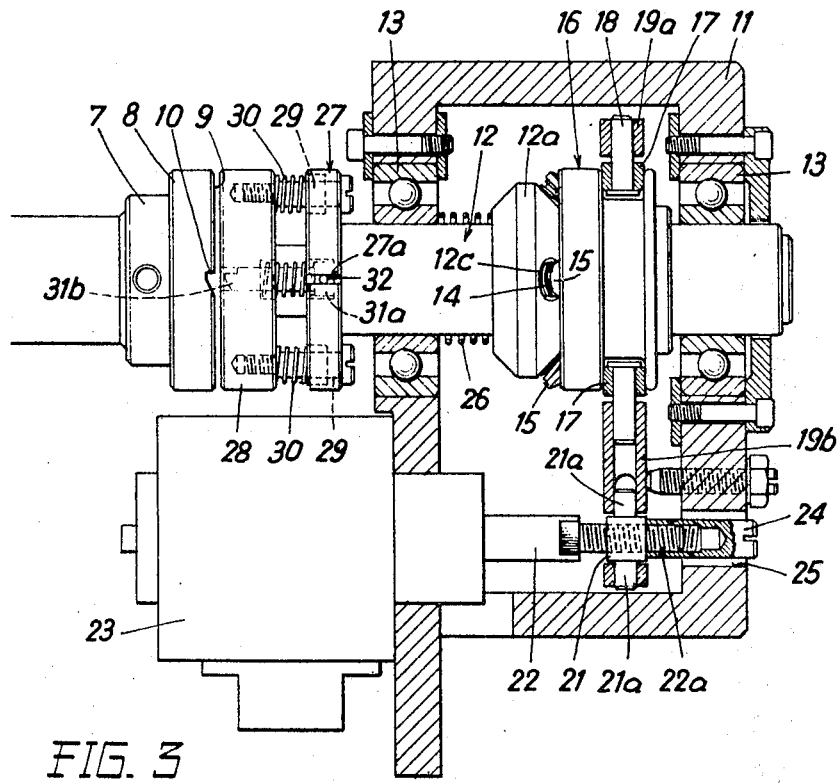
FIG. 3 is a top view partially in section.

The automatic lathe which is diagrammatically shown in FIG. 1 is in the main of a well-known construction. On a bed 1 a headstock 2 is secured in which a workspindle is rotatably mounted. This workspindle is equipped at its fore end with a chuck 4 of known construction which is so designed that it can hold a bar of material A having a polygonal cross-section, for example a square cross-section, this chuck is, as usual, connected for rotation with the workspindle 3 and its central opening has a cross-section shaped in accordance to that of the bar of material A. At its rear end the automatic lathe is equipped with an automatic loader 5 of a well-known type which comprises a pusher 6 of which only the laterally saliant portion 6a is shown.

A nut 7 is secured to the rear end portion of the workspindle 3 and carries a clutch member 8 having a friction surface 9 into which a radially extending notch 10 is cut which has the shape of a saw-tooth.

Onto an extension 2a of the sole of the headstock 2 the sole of a casing 11 is removably secured by means of screws not represented. A tubular transmission member 12 is mounted for rotation by means of two ball bearings 13 in the two transversal walls of the casing 11, so that it can also move in its axial direction. This member 12 has approximately at mid-length a peripheral exterior flange 12a provided with a circular row of borings 12b which are all inclined at the same angle to the common axis of rotation of the transmission member 12 and of the workspindle 3. In each of these borings a pusher element 15 is mounted to be freely movable in its longitudinal direction; a coil spring 14 which is partially guided in an enlarged portion of each such boring acts onto a head at the upper end of the pusher element 15, the upper surface of which is bulged or in a modification provided with an inserted ball, so that this end portion is pressed against an inwardly turned conical surface 16a on a muff 16. This muff is mounted for free rotation and for axial movement on the transmission member 12, it has a peripheral groove 16b and is engaged by two rollers 17 which are arranged along one common diameter of the muff on pins 18. These pins are fixed to the arms 19a and 19b of a lever 19 mounted on the casing 11 by means of pivot pins 20, the common axis of which is parallel to the above mentioned diameter. The arm 19b has a recess 19c the lateral walls of which are provided with slits in which the fingers 21a of a drag plug 21 may slide. The drag plug has a bore through which extends a threaded extension 22a of a rod 22. This rod makes part of the movable portion of an actuating device 23 which may be constituted for example by an electro-magnet or by a hydraulic or pneumatic unit having a piston and a cylinder. A cap nut 24 which protrudes through a hole 25 of the casing 11 is provided for adjusting the position of the drag plug 21 on the threaded extension 22a and thus also for the adjustment of the position of the lever 19 and of the muff 16. A coil spring which acts as a return-spring surrounds that portion of the tubular transmission member 12 which extends between the flange 12a and the ball bearing 13. On the other side of this ball bearing the member 12 carries a disc 27 secured to it by a screw 127. A clutch disc 28 is guided on a fore extension of the transmission member 12. It is provided with two screws 29 the heads of which take rest on the rear surface of the disc 27, springs 30 surround the shanks of the screws 29 and have the tendency to move the clutch disc 28 away from the disc 27. A bolt 31, the axis of which is parallel to the common axis of the workspindle and of the transmission member 12, as are also the axes of the screws 29, is guided in a boring of the clutch disc 28 and processes a head 31a engaging a blind bore of the disc 27; this head 31a is provided with a transversal pin 32 a saliant portion of which may slide in a longitudinal slit 27a of the disc 27, this pin thereby prevents a rotation of the bolt 31 the fore end of which constitutes a tooth 31b intended to engage the notch 10 of the clutch member 8. As the clutch disc 28 is pressed against the clutch member 8, the former moves against the force of the springs 30, thereby eventually exposing the tooth 31b of the bolt, which normally is hidden within the clutch disc bore. The exposed tooth is thus free to enter the notch 10 of the clutch member.

The manner of operation of this device is as follows. When during its feeding movement a new bar of material A has passed with its fore end between the pressure elements 15, as indicated in dot-and-dash lines at FIG. 2, the saliant portion 6a of the pusher 6 actuates an electrical contact 33 in order to energize either the electromagnet constituting the device 23 or an electro-valve controlling the feeding of pressurized fluid to the cylinder and piston unit which in a modification constitute this device. In either case the rod 22 is shifted to the left (FIG. 2) and produces by means of the lever 19 a corresponding displacement of the muff 16 which then acts by its conical surface 16b onto the heads of the pusher elements 15. These elements are thereby pushed against the bar of material A thereby to produce if necessary a small rotation of the member 12 in one direction or the other until the radial planes containing the axes of the pusher elements 15 are perpendicular to the longitudinal surfaces of the bar of material (FIG. 5). In this manner the member 12 is rotationally oriented with respect to this bar. For facilitating this orienting function of the pusher elements, these elements are preferably provided at the interior end with a flat surface 15a. In order that these surfaces may correctly act, it is necessary that the pusher elements 15 be prevented to rotate around their own axis; to this end which is provided with a laterally roding pin 34 capable of sliding in a longitudinal groove provided in the wall of the corresponding boring 12b.

The shifting movement of the muff 16 is not terminated at the end of this orienting function; during its continued shifting movement the muff 16 now takes with it the trans- with it the transmission member 12 and the disc 27. This disc 27 now presses the clutch disc 28 against the clutch member 8 which is fast on the workspindle 3. Due to the friction which results from such engagement all the rotary parts including the bar of material A are put into rotary movement. When the speed of this movement is approximately equal to that of the workspindle, the tooth 31b of the bolt 31 engages the notch 10 and thus provides a positive connection of the workspindle, with all these parts in a relative angular position which is predetermined and in which the bar of material A is perfectly oriented in the polygonal opening in the chuck 4. As soon as the bar A is held by the chuck, an electric contact not represented, which is actuated either by the saliant portion 6a of the pusher 6 or by a cam disc fixed on the main control shaft of the automatic lathe interrupts the energizing circuit of the actuating device 23. The rod 22, the muff 16 and the tubular transmission member 12 and the parts which are carried thereby return into their respective initial position.

The embodiment which has been described with reference to the drawings could be modified in many respects.

In one possible modification, represented in FIG. 6, the pusher elements which are analogous to the pusher elements 15 are provided at their inner end, which is forked, with a roller 116 which can freely rotate on an axial pin 117.

Although the preferred embodiments have been described, the scope of, and the breadth of protection afforded to, the invention are limited solely by the appended claims.

What is claimed is:

1. An automatic lathe including a headstock, a workspindle mounted in said headstock and defining a rear end, a fore end, and an axis of rotation, a chuck incorporated at the fore end of said workspindle for holding a bar of material having a polygonal cross-section, said lathe intended to be used in conjunction with an automatic loader for feeding a bar of material through the rear end of said workspindle, and wherein the improvement comprises a tubular transmission means located at the rear end of said workspindle and mounted for free rotation about an axis coincident with that of said workspindle, a plurality of pusher means incorporated in said transmission means for so pressing on at least some of the longitudinal surfaces of the bar of material as to orient said transmission means rotationally with respect to the bar profile, clutch means mounted on said transmission means and held against rotation, and a clutch member rigidly mounted on the rear end of said workspindle, said clutch means cooperating with said clutch member to produce first a frictional and then a positive engagement at a predetermined angular position between said clutch means and clutch member, whereby angularly to position the bar of material about its longitudinal axis correctly in said chuck.

2. The automatic lathe as defined in claim 1, including a series of through bores incorporated in said transmission means and spaced along the periphery of the cross-section thereof, said bores extended intersecting the axis of rotation of said transmission means at the same angle, each said bore having and guiding a respective said pusher means for sliding movement therein, resilient means for biasing each said pusher means away from the axis of rotation of said transmission means, muff means coaxially mounted on said transmission means and longitudinally slidable thereon to act on each said pusher means to cause the latter to move against the resilient bias, and actuating means (23) for longitudinally moving said muff means to shift said pusher means against the resilient bias until they press against at least some of the longitudinal surfaces of the bar of material.

3. The automatic lathe as defined in claim 2, including means for mounting said transmission means free to move longitudinally and parallel to its axis of rotation, resilient means for longitudinally biasing said transmission means away from said workspindle, said muff means acting on said transmission means to move the latter longitudinally against its resilient bias when said pusher means are pressed against at least some of the longitudinal surfaces of the bar, whereby said clutch means is pressed against said clutch member.

4. The automatic lathe as defined in claim 3 including means for producing a positive engagement between said clutch means and said clutch member after a frictional engagement therebetween has been established.

5. The automatic lathe as defined in claim 4, wherein said means for providing a positive clutch engagement includes an elongated member defining a fore end located opposite said clutch member and a rear end and extending parallel to the axis of rotation of said transmission means, means for mounting the rear end of said elongated member on said transmission means, a bore in said clutch means through which said elongated member passes, and a notch in said clutch member for receiving the fore end of said elongated member when said clutch means has approximately reached the speed of said clutch member.

6. The automatic lathe as defined in claim 5, including means for mounting said clutch means free to move longitudinally on said transmission means, resilient means biasing said clutch means towards said clutch member, and wherein the free end of said elongated member is hidden within said bore in said clutch means when the latter is not pressed against said clutch member, and said clutch means is moved against its resilient bias to expose the fore end of said elongated member when said clutch means is pressed against said clutch member.

7. The automatic lathe as defined in claim 6, including a respective roller mounted on the end of each of said pusher means nearest the bar of material for engaging the longitudinal surfaces thereof.

8. The automatic lathe as defined in claim 7, including a conical surface incorporated in said muff means for bearing on said pusher means when said muff means acts on said pusher means.

References Cited

UNITED STATES PATENTS

| | | | |
|---|---|---|---|
| 1,885,224 | 11/1932 | Brinkman et al. | 82—38 XR |
| 2,759,735 | 8/1956 | Cross | 82—2.5 XR |
| 2,839,959 | 6/1958 | Naill et al. | 82—28 |

LEONIDAS VLACHOS, Primary Examiner

U.S. Cl. X.R.

82—28